Dec. 22, 1953  W. E. BRADY  2,663,596
SAFETY BRAKE MECHANISM
Filed April 4, 1951  2 Sheets-Sheet 2
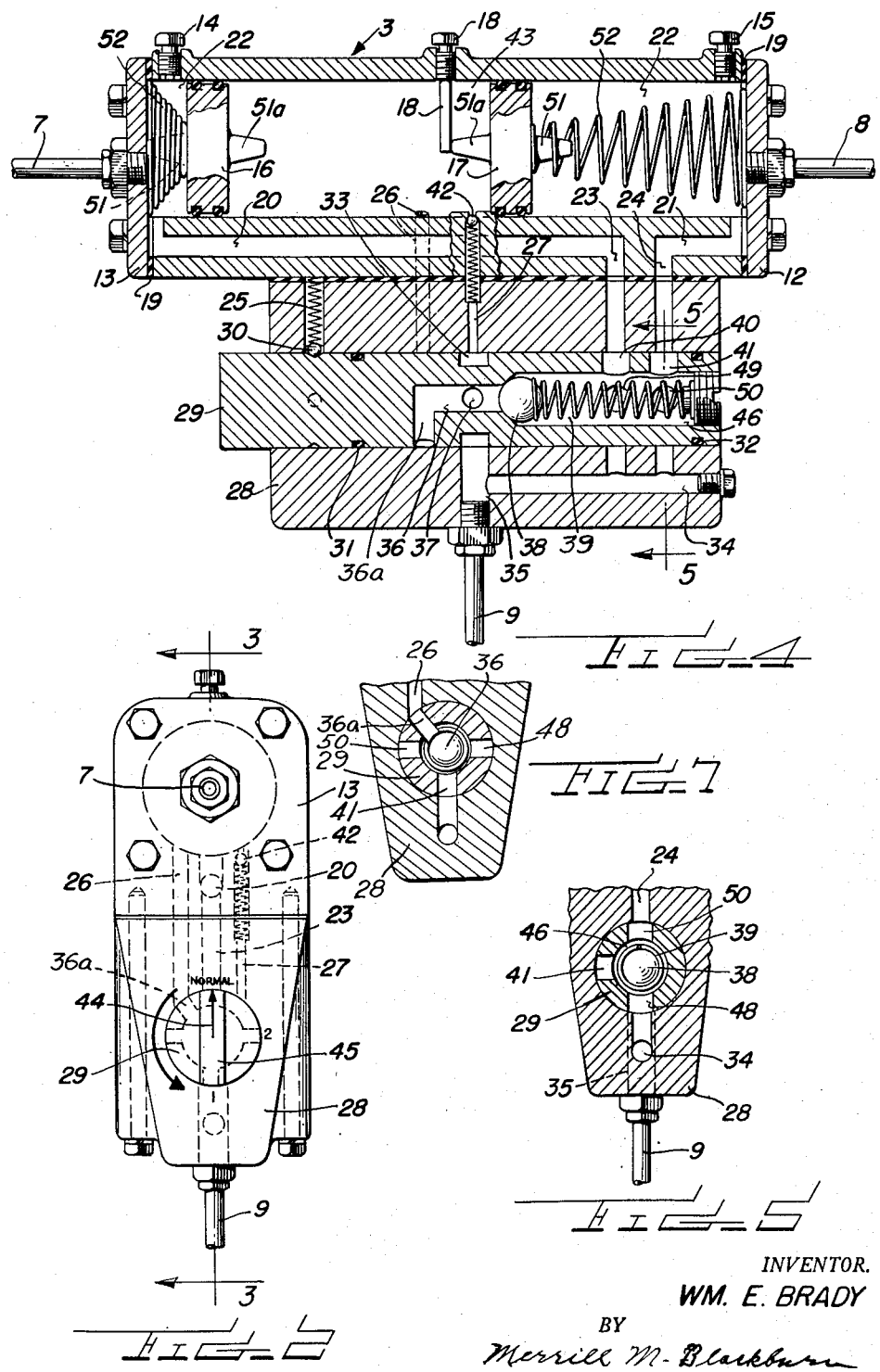
INVENTOR.
WM. E. BRADY
BY
Merrill M. Blackburn
ATTORNEY Patented Dec. 22, 1953

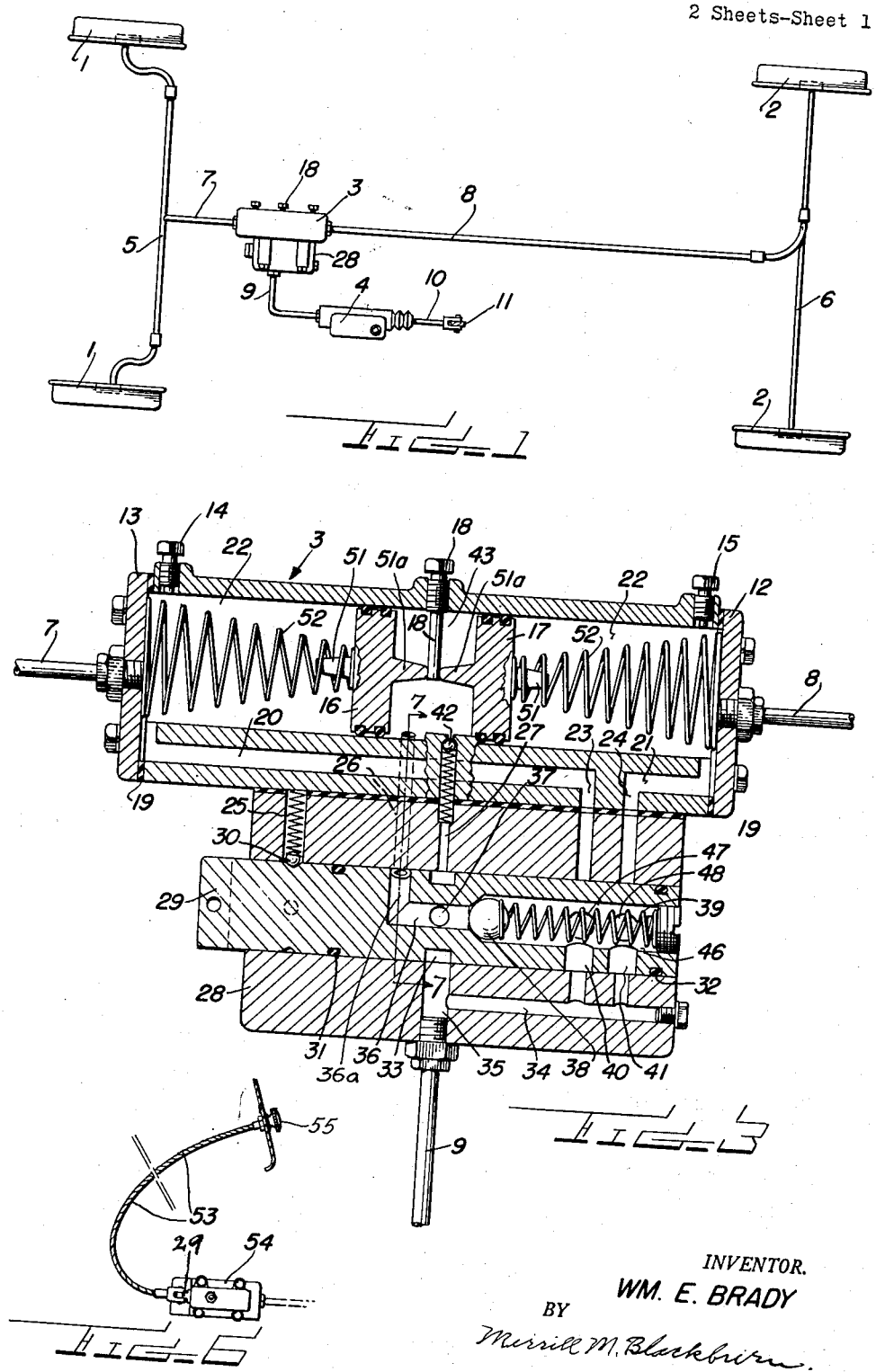

2,663,596

UNITED STATES PATENT OFFICE 2,663,596

SAFETY BRAKE MECHANISM

William E. Brady, Baldwin, Iowa

Application April 4, 1951, Serial No. 219,250

4 Claims. (Cl. 303—84)

My present invention relates to means for stopping a car, truck, or any other machine, equipped with a hydraulic brake system, even though one of the pipes leading to the brakes of the front or rear wheels should break and allow the hydraulic fluid to escape. Another object of this invention is to provide means whereby the hydraulic fluid may be replaced when it has leaked out of a wheel cylinder system so that the brakes work imperfectly.

In the drawings annexed hereto and forming a part hereof,

Fig. 1 is a plan view of the piping system of a car showing the pipes carrying the hydraulic fluid;

Fig. 2 shows an end view of the distributing cylinder;

Fig. 3 represents a longitudinal section substantially along the plane indicated by the line 3—3 in Fig. 2;

Fig. 4 represents the same structure as Fig. 3 with parts in a different operative position;

Fig. 5 represents a transverse section substantially along the plane indicated by the line 5—5 in Fig. 4, but with the valve in a position turned ninety degrees (90°) to the left;

Fig. 6 represents a structure for turning the rotary valve member from inside of the vehicle; and Fig. 7 represents a fragmentary cross-section along the plane indicated by the line 7—7, in Fig. 3.

Reference will now be made in greater detail to the annexed drawings for a more complete description of this invention, which has been illustrated as applied to a four-wheel braking system, since those are predominating in the automotive field, although, of course, it will be understood that it can be applied to a two-wheel system or a system using more than four wheels. We will assume that the front wheels are denoted by the numeral 1 and the rear wheels by the numeral 2. The distributing valve for the brake fluid is denoted by the numeral 3 and the master cylinder by the numeral 4. The pipes leading to the wheels 1 and 2 are denoted, respectively, by 5 and 6. The pipes leading from the distributing valve 3 to the pipes 5 and 6 are denoted by the numerals 7 and 8, respectively. The master cylinder 4 is connected to the distributing valve 3 by a pipe 9, and the piston of the master cylinder is operated by a piston rod 10. The brake pedal is indicated, generically, by the numeral 11. The cylinder of the brake valve is shown as having its ends closed by plates 12 and 13, and as having air bleeder members 14 and 15.

There are pistons 16 and 17 which are movable back and forth in the valve 3, and a stop member 18 for preventing the pistons from going beyond the mid-point of the valve, as well as serving as a bleeder screw for a chamber 43. Gaskets 19 may be used between the end plates 12 and 13 and the ends of the distributing valve 3 to prevent leaking of fluid. The pistons 16 and 17 have projections 51 reaching toward the ends of the valve to keep the pistons from covering the openings from the pipes 7 and 8, the channels 20 and 21, and the openings for the bleeder members 14 and 15. These must be continuously kept open and the pistons must, therefore, be kept away from them.

The openings of the channels 20 and 21 are formed in the thick wall of the auxiliary block, or addition to the cylinder, and have angular extensions 23 and 24 extending through the lateral wall of the block. Other openings or channels 25, 26, and 27 extend through the wall of the auxiliary block or addition 28, if same is used, and cooperate with a rotary valve member 29. A spring-pressed latching member 30 is located in the opening 25 and engages in depressions in the face of the rotary valve member 29 to hold this in adjusted position and to keep it from moving out, longitudinally.

Rings 31 and 32 serve to prevent leakage between the rotary valve member 29 and the auxiliary block 28. In the member 29 is cut a circumferential groove 33 which receives fluid from the master cylinder 4 through the pipe 9. An opening 34 opens into channel 35 and communicates through the latter with the pipe 9 which leads to the master cylinder, and branch channels or angle extensions 23 and 24 lead from the channels 20 and 21 to the valve 29. Fluid pumped through the pipe 9 into the annular channel 33 may enter channel 36 through port 37 and, when the valve member 29 is turned to a position such that opening 36a is in alignment with channel 26, as shown in Fig. 7, fluid under pressure may flow from the angular extension 36a through the passage 26 into the chamber 43 between the pistons 16 and 17.

When valve 29 is turned so that openings 40 and 41 are in alignment with angular extensions 23 and 24, fluid may pass the spring pressed ball 38 into channel 39. From channel 39, as shown in Fig. 4, the fluid may pass through openings 40 and 41 into the angular extensions 23 and 24 and channels 20 and 21 into the distributing valve 3, where it forces the pistons 16 and 17 back toward central position, spring check 42 yielding under pressure, as explained hereinafter. At the same time, it will fill the pipes 7 and 8 and the system connected therewith.

The opening in the valve chamber 43 is preferably cylindrical in shape but is eccentrically positioned in relation to the valve block, as shown in the upper part of Fig. 2. When the fluid pressure is built up in the valve chamber 43 by the pressure of the springs in the brakes, the operator having relieved the pressure in the master cylinder 4, the hydraulic pressure in cylinder 43 can be relieved by putting the valve member 29 in the position shown in Fig. 5, when the liquid flows out through openings 20 and 21 and the pipe 9. At the same time, liquid is discharged from chamber 43 through valve 42 and channel 27, there being no forward pressure in the pipe 9 and opening 37.

Normally, the spring in the cylinder of each brake will force the fluid in the brake line back toward the master cylinder. However, if there is a break in the system, the pressure tending to force the pistons back will be insufficient to accomplish this when the brake is actuated into braking position, the piston 16, as shown in Fig. 4 being in actuated position because of lowered resistance. However, piston 17 will be able to exert part of a normal breaking force and get the operator out of difficulty. By turning the rotary valve member 29 to the position shown in Fig. 4, the pistons 16 and 17 will be forced into non-actuated position, shown in Fig. 3 by the springs of a wheel brake. The fluid in chamber 43 will be relieved through valve 42 and opening 35, there being no pressure in pipe 9, as shown in Fig. 4. In Fig. 4, the passage 26 is cut off and the check valve 38 prevents the return of the fluid from the chambers 22 to the pipe 9. Thus the fluid pressure is maintained in the brake lines and associated parts until any and all of the bleeder members can be reinstalled or closed. After that, the valve 29 may be returned to its normal operating position, as shown in Fig. 7. When restoring fluid to the brake lines, as the parts are as shown in Fig. 4, the inward movement of the pistons 16 and 17 is limited by lugs 51a.

However, when the operator removes his foot from the brake pedal, fluid in the chamber 43, from having operated the brakes, will be allowed to escape from the chamber 43 when the pistons are forced back, there being no pressure in the pipe 9, the spring check 42 yielding under pressure of the fluid in the chamber 43 as the pistons are retracted.

There is a break in the section of Fig. 3 so that it is off-center, the opening 27 not intersecting the channel 20. Likewise, the channel or opening 26 is off-center and does not intersect the channel 20. The stop member 18 extends inwardly into the chamber 43 and acts as means to prevent either piston 16 or 17 from interfering with the conveyance of fluid into the chamber 43. The stop member 18 also acts as an air-bleeder screw to let air out of the chamber 43.

An indicator 44 is placed on the end of the rotary valve member 29 to indicate the position of the openings in the valve member. There is also a knob 45 for the turning of the valve member 29. As pointed out above, the spring-pressed valve member 38 is in an opening 39 in the rotary valve member 29. This opening 39 extends longitudinally of the rotary valve member 29, and transverse openings extend from outside of this valve member 29 to the opening 39. Two of these openings are denoted as 40 and 41, while 47 and 48 denote two others of these openings. The remaining two openings are denoted by the numerals 49 and 50. Openings 40 and 41 may be brought into registry with the openings extending from the opening 34, in which event the flow of fluid from the opening or channel 34 will be cut off, as shown in Fig. 3, because there is no opening upwardly. When the rotary valve 29 is in the position shown in Fig. 5, the openings in the valve are as shown, and there are open channels from the channel 34 through the openings 47 and 48, and from there through the outlets 49 and 50 to the angular extensions 23 and 24. This is for the purpose of permitting brake pressure without operation of the pistons 16 and 17. When pressure on the brake pedal is relieved, the fluid will come back through pipes 7 and 8, angular extensions 23 and 24, and channels 49 and 50, 47 and 48 to channel 34 and the master cylinder 4.

In "normal" braking position, the rotary valve member 29 is turned as shown in Fig. 3. Here the fluid cannot get out of the opening 39 but must go through the circumferential groove 33, port 37, channel 36, channel 36a and opening 26 to the chamber 43 where it can actuate pistons 16 and 17 into braking position. In this position, the openings 40 and 41 are down, as shown in Fig. 3, but there is no opening leading to the angular extensions 23 and 24. Under no circumstances is there communication from channel 33 to chamber 43 but there may be communication from chamber 43 by way of valve 42 to channel 33, as when pistons 16 and 17 are moved toward the middle of valve 3.

When the valve 29 is turned so that the arrow 44 points upwardly, the openings 49, 50 and 47, 48 are horizontal, and openings 40, 41 are down, communicating with 34, and the openings 36a communicates with the opening 26, and the pistons 16 and 17 are pressed to the ends of the cylinder, applying the brakes.

If a break occurs in the pipe 7, allowing the fluid to leak out, the piston 16 will go out until stopped by the projection 51 striking the end 13 of the valve 3, as shown in Fig. 4. When the rotary valve member 29 is in the position shown in Fig. 3, there can be operation of the brakes by reasons of channels 35, 36, 36a and 26. However, when the valve 29 is turned until the arrow points at 1, then the parts will be in the position shown in Fig. 4, and the piston will be pushed back to starting or neutral position, as shown in Fig. 3, when the brake pedal is actuated. The course of the fluid under such circumstances is through pipe 9, circumferential groove 33, port 37, spring-pressed ball 38, channel 39, openings 40 and 41, angular extensions 23 and 24, channels 20 and 21, into the valve chamber 22, thus pushing the pistons 16 and 17 back. In order to limit the movement of the pistons 16 and 17, there are provided lugs 51a which engage the stop member 18, thus furnishing means for stopping the pistons. This locks the brakes until relieved by turning valve 29. On the other hand, if the rotary valve member 29 is turned, as shown in Fig. 5, and the master cylinder is actuated, the fluid will pass through openings 47 and 48, 49 and 50, 23 and 24, 20 and 21 and return the pistons 16 and 17, putting on the brakes, springs 52 plus the pressure of fluid in chambers 22 being in excess of the pressure of valve 42.

The structure shown in Fig. 6 is for the purpose of actuating the rotary valve member 29 from the driver's compartment. It is thought that it will be clear that the driver can operate the valve member 29 to cause operation of the brake as an emergency brake. If one of the pipes 7 and 8 should break, allowing the oil to escape from the braking system of the front or rear wheels, this would be regarded as an emergency. When the valve 29 is turned, as shown in Fig. 4, fluid pumped by a master cylinder will be pumped through openings 9, 35, 33, and 37 and pass valve 38 and through 40, 41, 23, 24, 20, and 21 into chambers 22, thereby forcing the pistons toward the center of the cylinder body. When fluid is pumped into circumferential groove 33, it cannot go through channel 27 because this is closed off by valve 42. Continued pumping of the master cylinder will cause pressure to be built up in chambers 22 by reason of the fluid forced through channels 20 and 21. This will cause pistons 16 and 17 to be moved into contact with the stop 18, as shown by 17 in Fig. 4. When the chambers 22 are filled with fluid, there will be pressure built up in the tubes 7 and 8 to a point where the brake shoes will begin to contact the brake drums, causing braking action at the wheels and, of course, this fluid will remain trapped as such until the valve 29 is turned, as in Fig. 5 to release this trapped fluid which will release the brakes. A rod 53 is connected by a key to the valve member 29 in any suitable manner, as by bevel gearing or by a universal joint to head 55 which may be located in the driver's compartment. The head 55 is marked similarly to knob 45 so the operator can see what he is doing.

It is of course understood that the specific description of structure set forth above may be departed from without departing from the spirit of this invention as disclosed in this specification and as defined by the appended claims.

Having now described my invention, I claim:

1. A safety brake mechanism which comprises a master cylinder and a pair of brake lines, a distributing cylinder adapted to communicate at its ends with said brake lines, a pair of pistons movable toward and away from each other in said distributing cylinder, means maintaining said pistons in spaced-apart relation, stop means limiting movement of said pistons, a conduit leading from said master cylinder, a valve cylinder between said conduit and said distributing cylinder, a first pair of ports leading from the end portions of said distributing cylinder to said valve cylinder, a first port leading from said valve cylinder to the approximately central portion of said distributing cylinder, between said pistons therein, a second port leading from the central portion of said distributing cylinder to said valve cylinder, a first check valve normally closing said second port to the flow of fluid toward said distributing cylinder, springs acting between the end portions of said distributing cylinder and said pistons, and a rotary valve positioned in said valve cylinder and movable between a first and a second position, said valve cylinder including a third port communicating with the first port in the first position of said rotary valve, whereby fluid from said master cylinder may flow to the central portion of said distributing cylinder, thereby forcing said pistons outwardly and forcing fluid into said brake lines, said rotary valve having, also, a second pair of ports communicating in the second position of said rotary valve with said first pair of ports, a second check valve controlling said second pair of ports, and a third port communicating between said master cylinder and said first check valve controlling said second port, whereby fluid may be directed to the outer ends of said distributing cylinder and force one of said pistons toward the other, fluid between said pistons flowing through said first check valve by virtue of the superior pressure in the space between said pistons, created by the action of the associated springs and the pressure in the brake lines.

2. A safety brake mechanism as defined by claim 1 in which the second check valve is incorporated in said second port leading to the outer ends of said distributing cylinder so that fluid is retained under pressure in the brake lines until said rotary valve is moved out of said second position.

3. A safety brake mechanism as defined by claim 2 having an additional port establishing communication, in a third position of said valve, between the master cylinder and the outer ends of said distributing cylinder, and by-passing said third port and said second check valve associated therewith.

4. A safety brake mechanism which comprises a master cylinder and a pair of brake lines, a distributing cylinder adapted to communicate at its ends with said brake lines, a pair of pistons movable toward and away from each other in said distributing cylinder, means maintaining said pistons in spaced-apart relation, stop means limiting movements of said pistons, a conduit leading from said master cylinder, a valve cylinder between said conduit and said distributing cylinder, a pair of ports leading from the end portions of said distributing cylinder to said valve cylinder, a first port leading from said valve cylinder to the approximately central portion of said distributing cylinder, between said pistons therein, a second port leading from the central portion of said distributing cylinder, a check valve in said second port, springs acting between the end portions of said distributing cylinder and said pistons, a rotary valve positioned in said valve cylinder and movable between two positions, said valve cylinder including a port communicating with the port leading from the rotary valve to the distributing cylinder, in one position of said rotary valve, whereby fluid from said master cylinder may flow to the central portion of said distributing cylinder, thereby forcing said pistons outwardly and forcing fluid into said brake lines, said rotary valve having, also, a third port communicating in the second position of said valve with said pair of ports, a check valve controlling said third port, and a fourth port communicating between said master cylinder and said third port, in at least the second position of said master valve, whereby fluid may be directed to the outer ends of said distributing cylinder and force one of said pistons toward the other, fluid between said pistons flowing through said check valve by virtue of the superior pressure in the space between said pistons created by the action of the associated springs and the brake springs.

WILLIAM E. BRADY.

References Cited in the file of this patent

UNITED STATES PATENTS

| Number | Name | Date |
|---|---|---|
| 2,053,557 | Hess et al. | Sept. 8, 1936 |
| 2,108,164 | Cornwell | Feb. 15, 1938 |
| 2,128,853 | Roen | Aug. 30, 1938 |
| 2,151,940 | Rumsey | Mar. 28, 1939 |